US011285080B2

(12) United States Patent
Whelan

(10) Patent No.: US 11,285,080 B2
(45) Date of Patent: Mar. 29, 2022

(54) SAMPLING PORT

(71) Applicant: Chris Whelan, Leichhardt (AU)

(72) Inventor: Chris Whelan, Leichhardt (AU)

(73) Assignee: NOBLE HOUSE GROUP PTY. LTD.

( * ) Notice: Subject to any disclaimer, the term of this patent is extended or adjusted under 35 U.S.C. 154(b) by 690 days.

(21) Appl. No.: 15/739,170

(22) PCT Filed: Jun. 27, 2016

(86) PCT No.: PCT/AU2016/000231
§ 371 (c)(1),
(2) Date: Dec. 22, 2017

(87) PCT Pub. No.: WO2016/205868
PCT Pub. Date: Dec. 29, 2016

(65) Prior Publication Data
US 2018/0369069 A1  Dec. 27, 2018

Related U.S. Application Data

(60) Provisional application No. 62/185,086, filed on Jun. 26, 2015.

(51) Int. Cl.
*A61J 1/20* (2006.01)
*B01L 3/00* (2006.01)
*B65B 3/00* (2006.01)
*G01N 1/10* (2006.01)

(52) U.S. Cl.
CPC ............... *A61J 1/2089* (2013.01); *B01L 3/56* (2013.01); *B01L 3/563* (2013.01); *B65B 3/003* (2013.01); *G01N 1/10* (2013.01); *B01L 2200/023* (2013.01); *B01L 2300/047* (2013.01);

(Continued)

(58) Field of Classification Search
CPC ........ A61J 3/07; A61M 5/1782; G01N 35/10; B01L 3/563; B01L 3/56; B01L 2300/0672; B01L 2300/047; B01L 2300/0854; B01L 2200/023; B65B 3/003
See application file for complete search history.

(56) References Cited

U.S. PATENT DOCUMENTS

2003/0153895 A1* 8/2003 Leinsing ............... A61J 1/2089
604/403
2004/0215106 A1* 10/2004 Sampson ......... A61B 5/150389
600/576
2015/0144224 A1  5/2015 Whelan

FOREIGN PATENT DOCUMENTS

EP         2332510      6/2011
WO      WO03066152     8/2003
(Continued)

*Primary Examiner* — Ariana Zimbouski
*Assistant Examiner* — Gabriella E Burnette
(74) *Attorney, Agent, or Firm* — Galbreath Law Offices, P.C.; John A. Galbreath

(57) ABSTRACT

A sampling port (10) has a generally cylindrical first portion (36), a generally cylindrical second portion (34) with a smaller diameter than the first portion (36) and a guide member (66) that rotates about a hinge (56) to extend into the second portion (34) to reduce the effective diameter of the second portion (34). The guide member (66) and/or the second and/or first portions (34, 36) are shaped so that the guide member can extend further into the sampling port (10) than a simple cylindrical guide member rotating into simple cylindrical first and second portions.

20 Claims, 14 Drawing Sheets

(52) U.S. Cl.
CPC ............. *B01L 2300/0672* (2013.01); *B01L 2300/0854* (2013.01)

(56) References Cited

FOREIGN PATENT DOCUMENTS

| WO | WO-2013177628 A1 | * | 12/2013 | ............. | G01N 1/10 |
| WO | WO2014033706 | | 3/2014 | | |

* cited by examiner

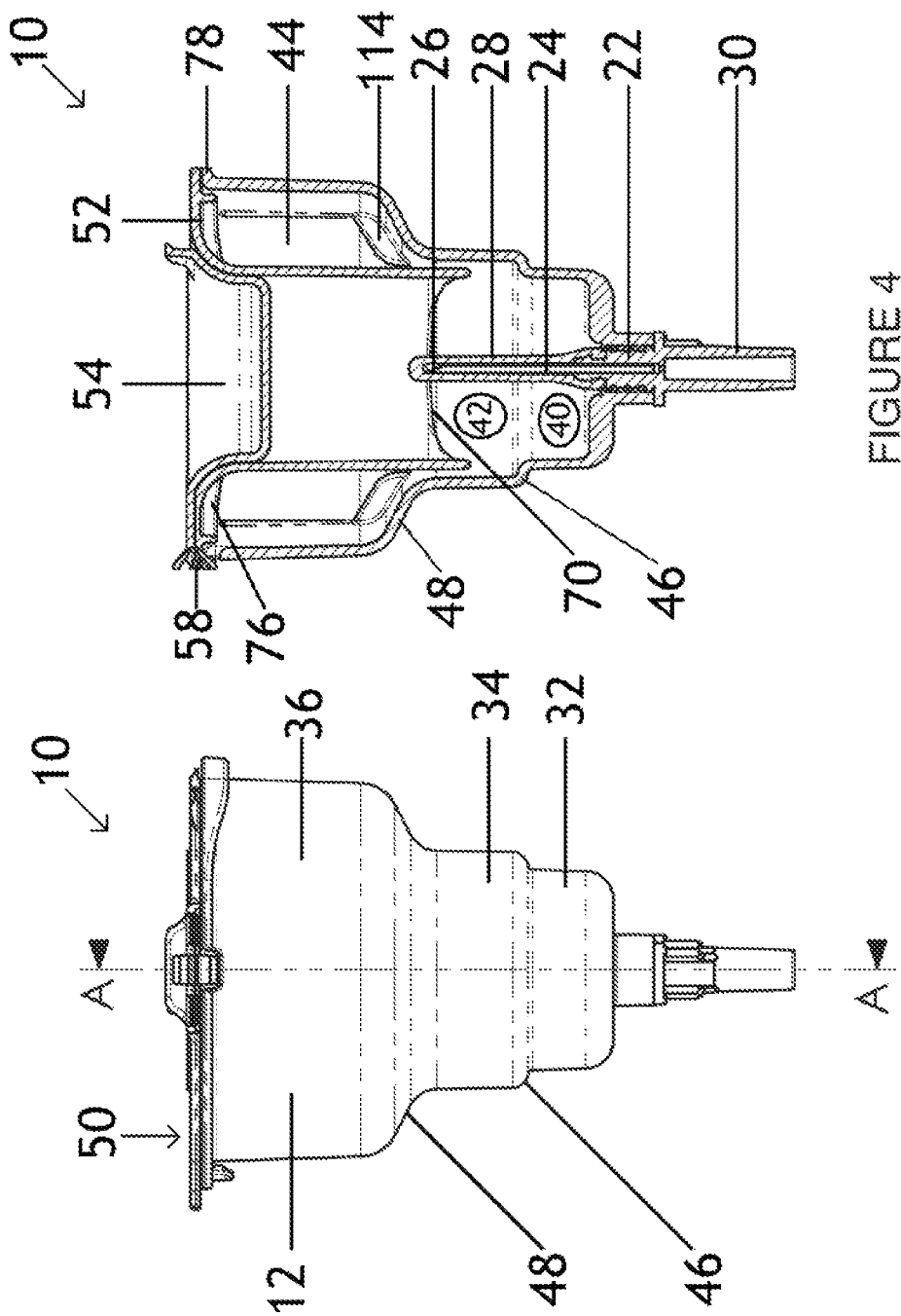

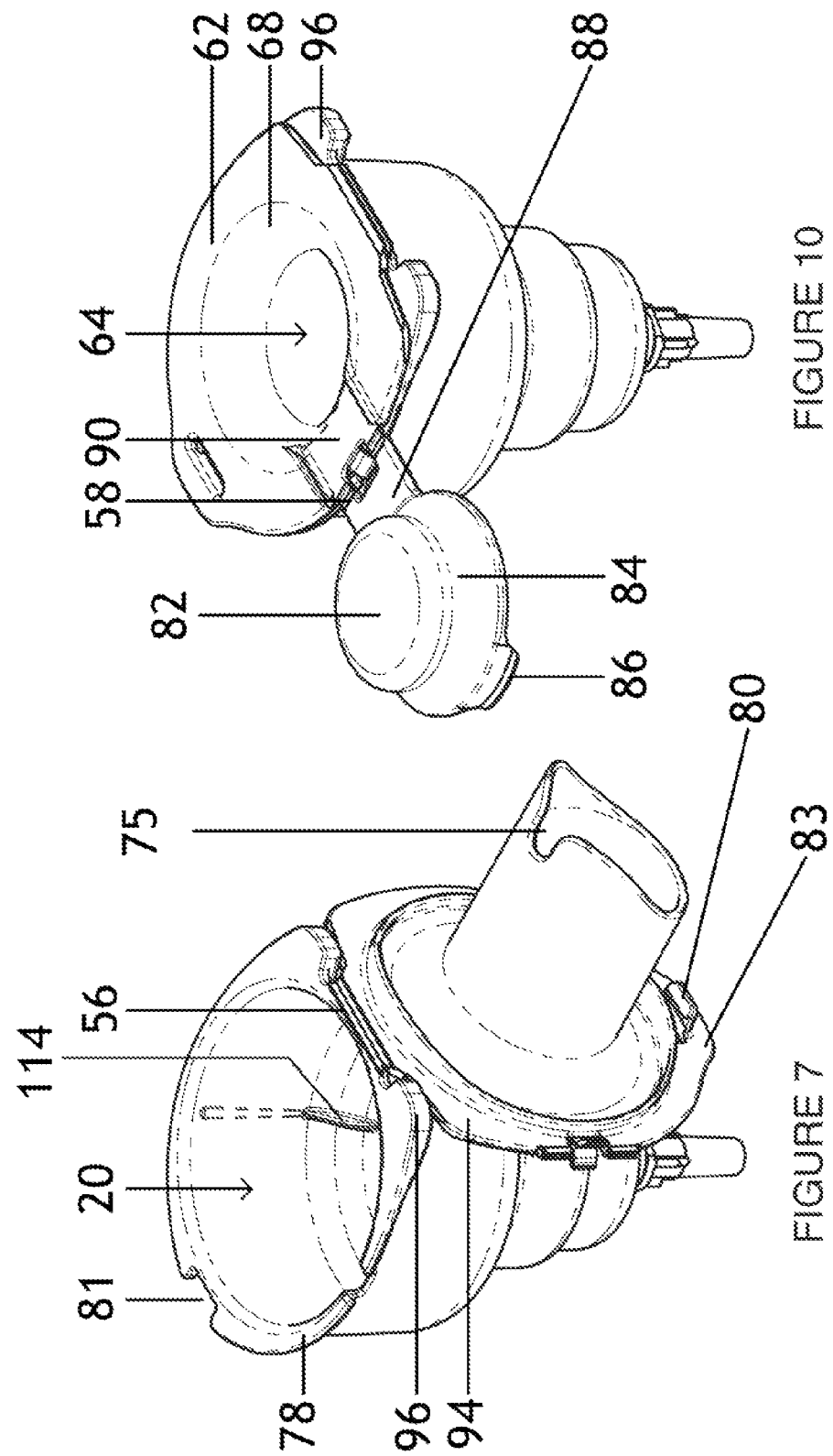

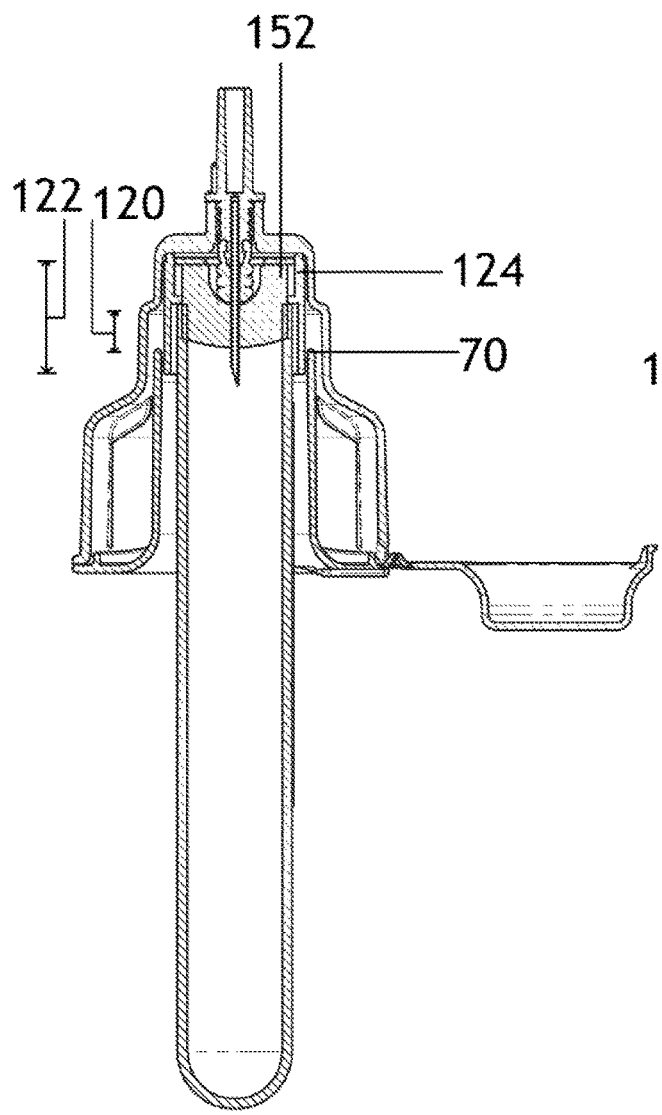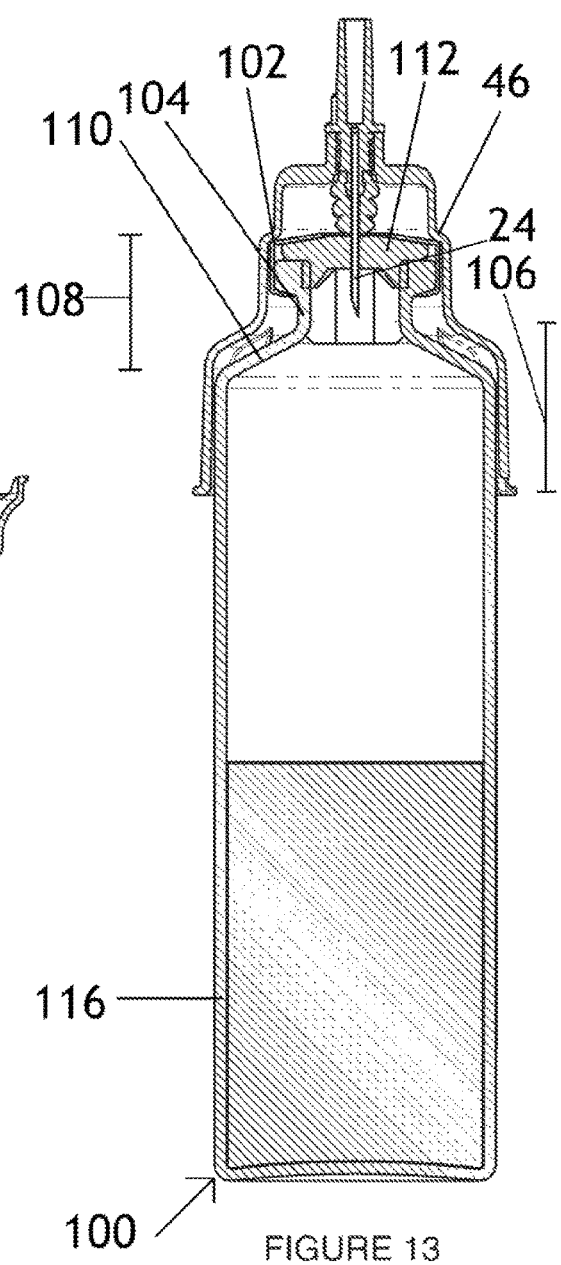
FIGURE 12
FIGURE 13

SAMPLING PORT

FIELD OF INVENTION

This invention relates to medical sampling ports and more particularly providing a sampling port that can accommodate different diameter sampling bottles and/or vials. For ease of reading the term "sampling vial" alone is used in this specification and the term "sampling vial" is to be interpreted to include both sampling vial and sampling bottle.

BACKGROUND

Medical sampling ports are devices that allow a sample of fluid to be withdrawn, typically into a sampling vial. Typical sampling ports are tubular with one end closed to form a base and the other end open. A cannula is centrally mounted on the base and extends within the port toward the open end. The end of the cannula ends short of the end of the sampling port and so is not exposed. A sampling vial may be passed into the open end and impaled on the cannula.

It is desirable that the sampling vial when inserted into the sampling port is prevented from significant sideways movement, as this may result in damage to the cannula or incomplete penetration of the cannula into the sampling vial.

Sampling vials generally come with portions to be inserted in to a sampling port in two different maximum diameters. It is desirable that these different diameters are readily accommodated by the sampling port whilst also providing an ability to close the end of the sampling port to prevent needle stick injury.

SUMMARY OF THE INVENTION

In one broad form the invention provides a sampling port having:
 a body having a space having a longitudinal direction, open at one end and adapted to receive a sampling vial;
 a cannula having an axis and extending longitudinally along the space with a pointed end facing the open end, whereby a sampling vial passed into the space from the open end may be impaled on the cannula;
 at least one guide member movable relative to the body between a guide position and a non-guide position, wherein:
  in the guide position the at least one guide member extends into the space to reduce the effective size of part of the space, and in the non-guide position the at least one guide member is located outside of the space.

Preferably in the non-guide position a vial of a second size or second diameter may be inserted into the space onto the cannula.

Preferably, in the guide position, the at least one guide member guides a vial of a lesser size than the second size, when inserted into the open end. More preferably, when in the non-guide position, a vial of the second size does not contact the at least one guide member.

The at least one guide member is preferably mounted on or connected to the body. The at least one guide member may move about a hinge or a compound hinge.

However, movement may be by one or more of bending or deflection other than rotation about a hinge, or by movement of the guide member as a whole.

The space may have a first space portion adapted to receive a tubular body having a maximum first diameter.

The at least one guide member may define a guide space adapted to receive a tubular body having a maximum fourth diameter.

The second diameter may be the same or greater than the fourth diameter.

The space may have a second space portion adapted to receive a tubular body having a maximum second diameter smaller than the first diameter.

In another broad form the invention provides a sampling port having:
 a body having a space having a longitudinal direction, open at a first end and adapted to receive a sampling vial;
 the body comprising first and second portions spaced along the longitudinal direction with the first portion nearer the first end than the second portion;
  the first portion adapted to receive a tubular body having a maximum first diameter;
  the second portion adapted to receive a tubular body having a maximum second diameter, smaller than the first diameter;
 a cannula having an axis and extending longitudinally along the space with a pointed end facing the open first end, whereby a sampling vial passed into the space from the open first end may be impaled on the cannula,
 at least one guide member mounted on or connected to the body for movement about at least one hinge located at or adjacent the first end for movement between a guide position and a non-guide position, wherein:
  in the guide position at least part of a free end of at least one guide member extends into the second portion to reduce the effective size of part of the second portion to receive a tubular body of a maximum fourth diameter, and
  in the non-guide position the at least one guide member is located outside of the space, and
 wherein the at least one guide member and the body are configured so that the path of the free end of the or each of the at least one guide member clears the body as it moves about the respective at least one hinge between the guide and non-guide positions.

The space may have a third space portion adapted to receive a tubular body having a maximum third diameter, smaller than the second diameter and spaced along the axial direction with the second portion nearer the first end than the third portion.

At least part of the space may be defined by at least one first wall portion.

At least part of the space may be defined by at least one second wall portion.

The space may be defined by a generally tubular wall.

The at least one guide member may extend into the space from or adjacent the open end of the sampling port when in the guide position. However, the at least one guide member may extend into the space from opposite the open end and extend toward the open end.

The sampling port may include a centring surface at or adjacent the open end adapted to centre a vial over the cannula. The centring surface may be part of the at least one guide member.

The sampling port may include a plurality of guide members spaced about the axis of the cannula.

The at least one guide member may extend into one or both of the first and second space portions.

The sampling port may include at least one protective member that in a protective position closes the open end sufficiently to substantially prevent accidental access to the cannula by a user.

The at least one protective member is preferably movable from the protective position to a retracted position.

Movement of at least one protective includes one or more of bending, deflection, rotation about a hinge area and by movement of the at least one protective member as a whole.

The sampling port may include at least one protective member recess adapted to receive at least part of a protective member.

In a preferred form the at least one guide member comprises a tubular body. However, the at least one guide member may comprise a plurality of fingers or other guide members.

The at least one guide member may comprise an extension of the upper wall extending from the upper wall around the aperture.

The free end of the cannula preferably is located in the second space portion.

at least part of the free end or ends of the at least one guide member may extend into the second space portion.

at least part of the free end or ends of the at least one guide member may overlap the free end of the cannula.

At least part of the free end or an end of the at least one guide member may extend into the body more than another part of the at least one guide member or an end of another guide member.

The at least one guide member may be hinged to the body. The hinge is preferably at or adjacent the open end so the at least one guide member may be rotated out of the body to provide clear access to the open end.

The at least one guide member and the body are may be configured so that the at least one guide member may extend into the body so that at least part of a free end of at least one guide member is within the third space portion. At least part of a free end of at least one guide member may be adjacent the inner end of the third space portion.

The body may be configured with substantially cylindrical wall portions and/or space portions, in which case the at least one guide member is configured so that different free ends or portions of a free end of the at least one guide member are located at different distances from the open end and/or the hinge, so as to clear the wall portions as the at least one guide member is rotated between open and closed positions.

Alternatively the at least one guide member may be configured so that different free ends or portions of a free end of the at least one guide member are located at the same distance from the open end and wall portion(s) define a recess that extends further from their general cylindrical shape to receive the at least one guide member as the at least one guide member is rotated between open and closed positions.

The at least one guide member may be configured so that different free ends or portions of a free end of the at least one guide member are located at different distances from the open end and the second, and optionally the first, wall portion(s) define a recess to receive part of the at least one guide member.

In preferred embodiments the guide member(s) extend into the second portion and one or both of the guide member(s) and the second wall portion (and optionally the first wall portion) are shaped or configured such that a cylindrical tube providing the same reduced diameter as the actual guide member(s) and having an end adapted to lay in a plane perpendicular to the longitudinal direction at the same location as the most inward end of the actual guide member(s) would have a path of travel between the guide and non-guide positions that would contact at least part of a body having cylindrical wall portions with the first and second inner diameters.

In one form of the invention there is provided a main cap connected to the body about a hinge, preferably at or near the open end. The main cap has an upper wall that preferably substantially closes the open end of the body with an aperture in the upper wall centred over the cannula to allow access by a smaller vial. At least one guide member extends from the upper wall toward the cannula so as to guide a vial inserted into the aperture onto the cannula. The at least one protective member may comprise a secondary cap that is inserted into the aperture in the main cap, so that when both are closed access to the interior of the sampling port is prevented.

BRIEF DESCRIPTION OF THE DRAWINGS

FIG. 3 is a side view of the device of FIG. 1.

FIG. 4 is a cross sectional side view of the sampling port of FIG. 1 taken along line AA in FIG. 3.

FIG. 7 is a perspective view from above of a sampling port of figure in a fully open configuration.

FIG. 10 is a perspective view from above of a sampling port of figure in a partially closed configuration.

FIG. 12 is a cross sectional side view of the sampling port of FIG. 1 in use with a first size vial.

FIG. 13 is a cross sectional side view of the sampling port of FIG. 1 in use with a second size vial.

DETAILED DESCRIPTION OF IMPLEMENTATIONS OF THE INVENTION

Figure 2:
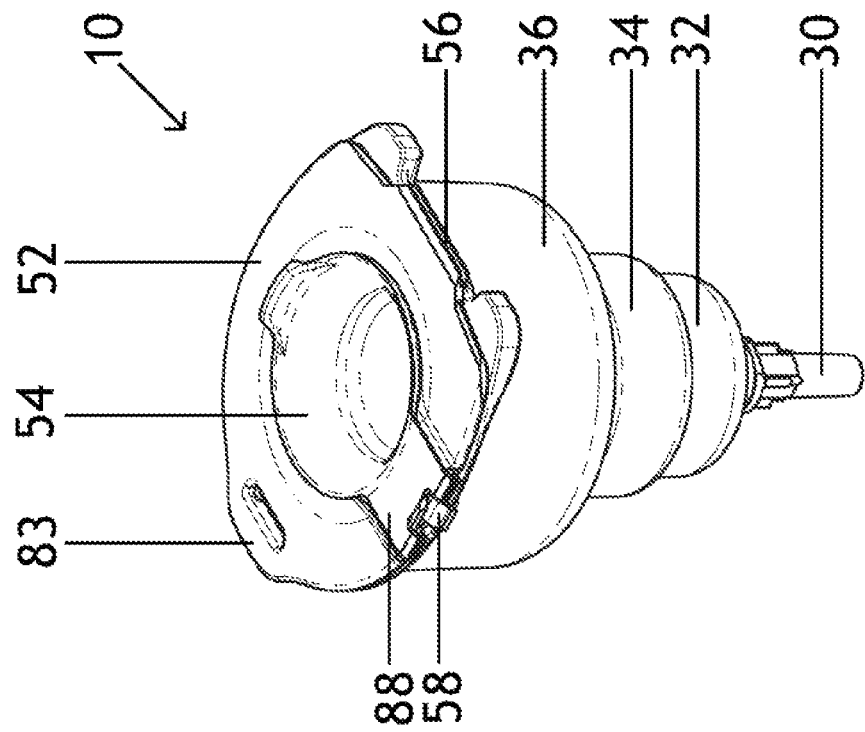
FIG. 2 is a perspective view from above of the sampling port of FIG. 1.
Figure 1:
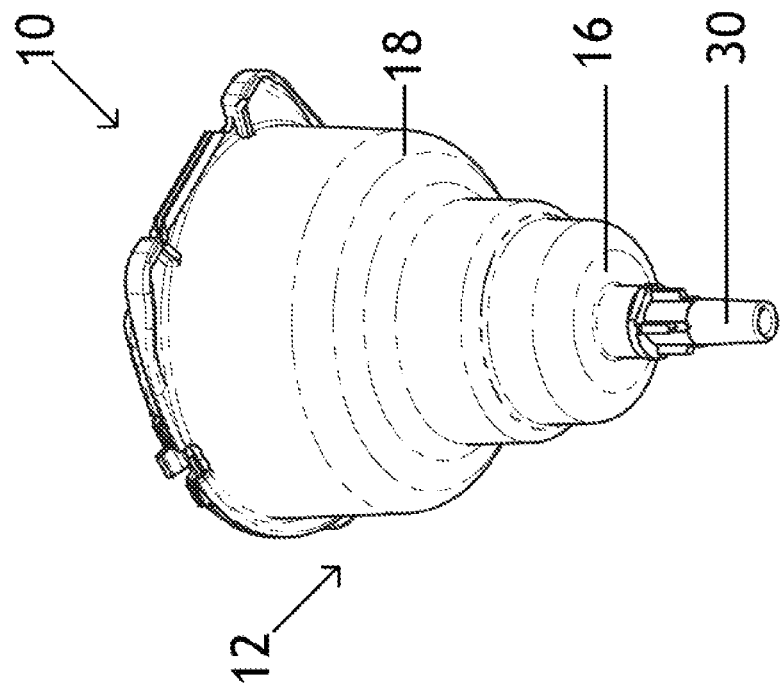
FIG. 1 is a perspective view from below of a sampling port according to a first implementation of the invention in a fully closed configuration.

Referring to FIGS. 1 to 7 there is shown a sampling port 10 according to one implementation of the invention.

The sampling port 10 has a generally tubular body 12. The body 12 has a base 16 at one end and a tubular side wall 18 that extends away from the base 16. The tubular side wall 18 defines an open end 20. Mounted on the base 16 is a needle assembly 22 having a cannula 24. The cannula 24 is mounted generally centrally and extends along the body toward the open end 20. The free end 26 of the cannula 24 is located away from the open end 20. A rubber sheath 28 preferably surrounds the cannula 24.

The interior of the cannula 24 communicates with a connector or piercing device of needle assembly 22 so that fluid may pass from the connector to the cannula 24 or vice versa. In the implementation shown the connector is a male Luer connector 30 and the assembly 22 is a screw fit into base 16. If desired the base 16 and assembly 22 may be formed together with the cannula mounted in the integral base. The type of connector or piercing device is not critical and variations may be used, including a male or female Luer, locking Luer, multi-sample (double-ended) needle, blunt cannula, spike etc.

The tubular side wall 18 is formed of three generally cylindrical wall portions arranged so the diameter of the body 12 increases in steps away from the base 16. Third wall portion 32 is of one diameter near the base 16, followed by second wall portion 34 and a first wall portion 38 of a larger diameter yet further away from the base 16. The third wall portion 32 defines a third space portion 40, the second wall portion 34 defines a second space portion 42 and first wall portion 38 defines a first space portion 44. The third and second and second and first wall portions are joined by shoulder portions 46 and 48 respectively. Shoulder portions 46 and 48 preferably extend at an angle to the respective wall portions but may each may extend perpendicularly to the wall portions independently of each other.

The space portion 42 is sized to accommodate and guide the cap 102 of a sampling bottle 100, as shown in FIG. 13 whilst the first space portion 44 is sized to accommodate and guide a larger diameter body 116 of the sampling bottle 100.

The end 26 of cannula 24 is preferably located within the space portion 42 but may be located in space portion 44.

The effective length 106 of the larger diameter first space portion 44 and shoulder portion 48 is preferably greater than the length 108 of the cap 102, neck portion 104 and bottle shoulder portion 110. As such, when a sampling bottle 100 is inserted into the body 12, the body 116 will engage and centre on the larger diameter wall 36 before the cap 102 reaches the smaller diameter wall 34. The cap 102 will then engage the wall 34 to, if necessary, further centralise the cap 102 and correct any misalignment before further insertion will impale the septum 112 on the cannula 24. In the embodiment shown ridge like protrusions 114 on shoulder 48 engage the shoulder 110 of bottle 100 to limit inwards movement. Depending on the bottle 100, the end of the cap 102 may engage the shoulder 46 to limit inwards movement. This may occur simultaneously with engagement with the ridges 114. Alternatively ridges 114 may be omitted and the shoulder 48 engages the shoulder 110 of bottle 100 to limit inwards movement. Alternatively or in addition, the wall 34 may be tapered inwards toward base 16 so as to limit inwards movement.

The diameter of the space portion 40 is sized to receive and engage a small diameter vial. However, the diameter of the space portion 42 and 44 is larger than that of a small diameter vial and so a small diameter vial inserted into the open end 20 would not be located and prevented from sideways movement by the wall portion 34 and 36.

The sampling port 10 is provided with a cap and guide assembly 50. The cap and guide assembly 50 comprises main cap 52 and secondary cap 54. In this embodiment the main cap 52 and secondary cap 54 are formed integrally with each other and with the body 12. The main cap 52 is connected to the body 12 for rotation about hinge 56. The secondary cap 54 is connected to the main cap 52 for rotation about hinge 58. The hinges 56 and 58 are preferably at 90 degrees to each other. This aids in isolating manipulation of the main cap relative to body 12 from manipulation of secondary cap 54 relative to main cap 52. The main cap 52 and secondary cap 54 are preferably formed integrally with the main cap 52 but one or both may be formed as a separate component.

Figure 9:
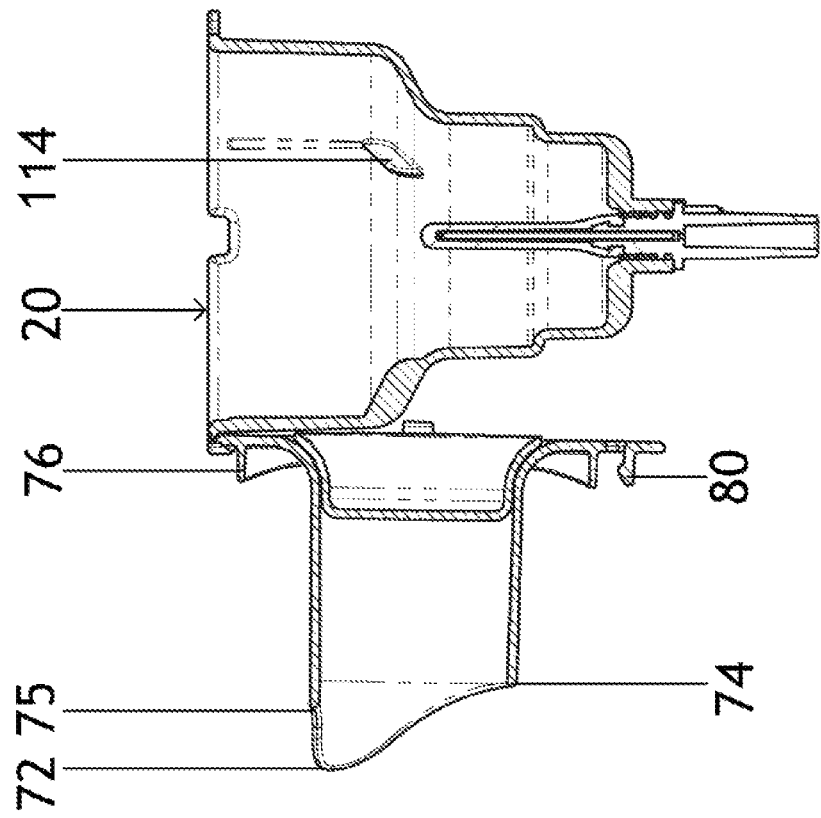
FIG. 9 is a cross sectional side view of the sampling port of FIG. 7 taken along line BB in FIG. 8.
Figure 8:
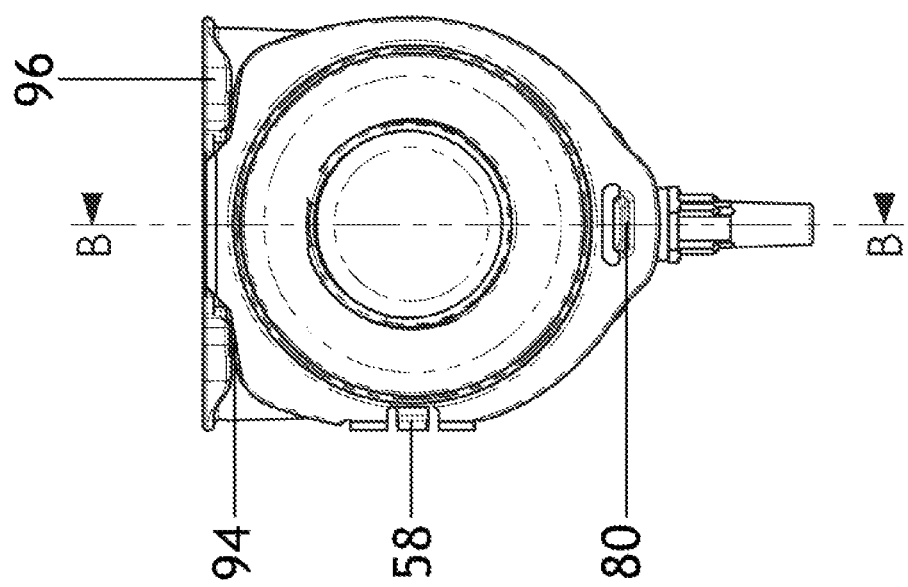
FIG. 8 is a front view of the device of FIG. 7.
Figure 11:
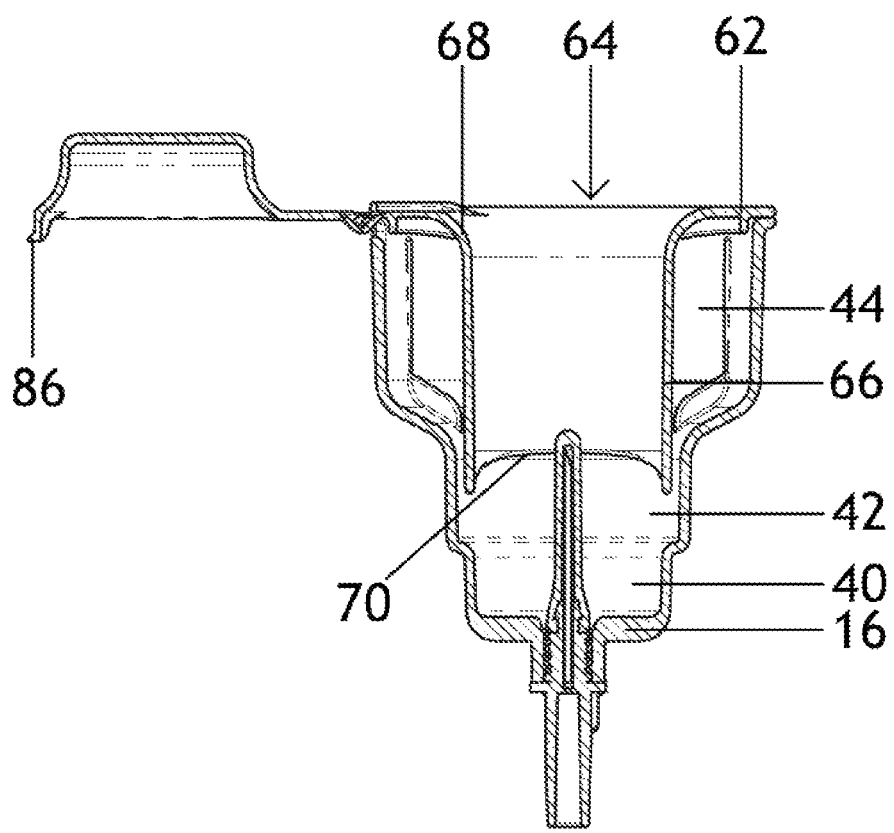
FIG. 11 is a cross sectional side view of the sampling port of FIG. 10.

The main cap 52 may be rotated from a closed position, as in FIGS. 1 to 6, to an open position, as in FIGS. 7 to 9. In the open position the main cap 52 is rotated about 270 degrees about hinge 56 relative to the closed position.

The main cap 52 includes an upper wall 62 having an aperture 64 therein and at least one guide member 66 that extends from the upper wall 62 about aperture 64. In the embodiment shown the at least one guide member 66 comprises a tube but other guide member structures may be used. A series of fingers surrounding aperture 64 may be provided.

The tubular guide member 66 is provided with a curved transition region 68 to aid insertion of a vial into the aperture and guide member. The tubular guide member 66 is preferably formed integrally with upper wall 62 but may be formed as a separate component that is connected to the main cap 52.

The sizes of the aperture 64 and tubular guide member 66 correspond to the size of a small diameter vial.

Figure 6:
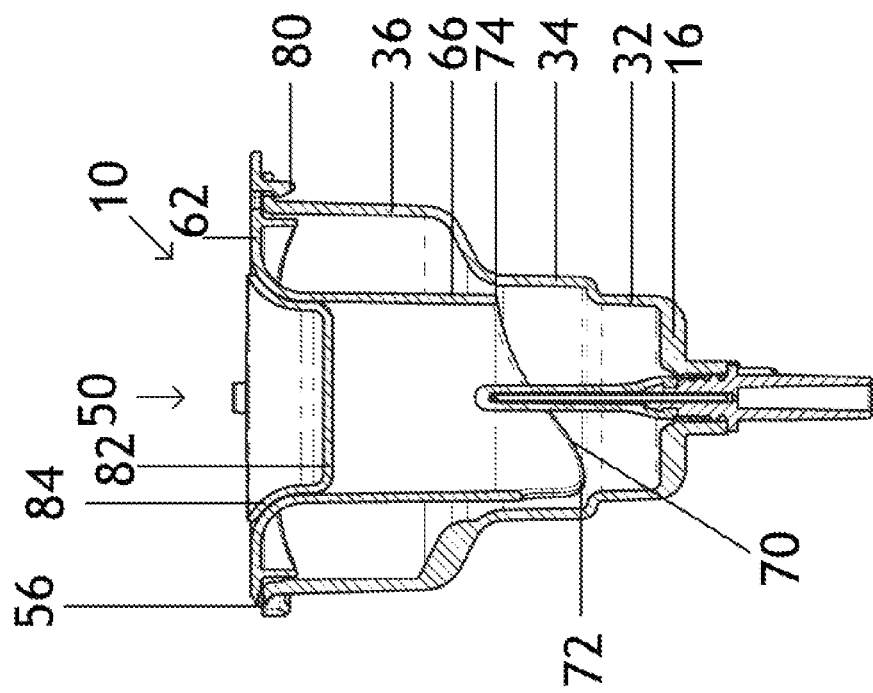
FIG. 6 is a cross sectional side view of the sampling port of FIG. 1 taken along line BB in FIG. 5.
Figure 5:
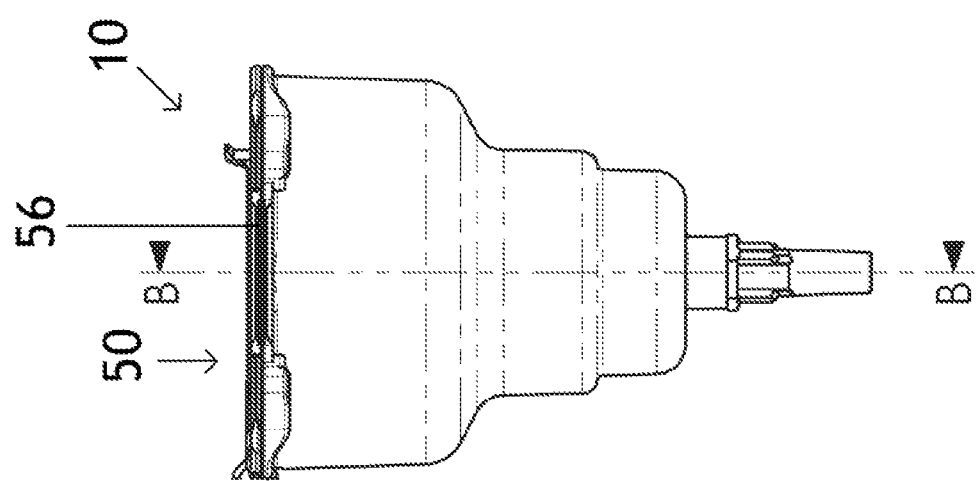
FIG. 5 is a front view of the device of FIG. 1.

As seen in FIGS. 4 and 6, when the main cap 52 is closed the tubular guide member 66 extends toward the cannula 24. In the preferred embodiment shown the tubular guide member 66 extends so at least part of its free end 70 extends into the space portion 42 and more preferably at least part of its free end 70 extends to at least the free end 26 of the cannula 24. The free end 70 of the tubular guide member 66 may extend past the free end 26 of the cannula 24. Where the at least one guide member comprises structure other than a tubular member, such as a series of elongate fingers, preferably at least part of at least one guide member extends into the space portion 42. More preferably at least part of the at least one guide member extends to at least the free end 26 of the cannula 24 and optionally at least part extends past the free end 26.

The guide member 66 extends into the second space portion 42 and, as best seen in FIG. 6, there is little clearance between the outside of the guide member 66 and the inside of wall portion 34.

As seen in FIGS. 4 and 6 the free end 70 of guide member 66 is not perpendicular to the wall of tubular guide member 66 or cannula but is angled or curved. The free end may be angled or curved so the portion 72 closest to the hinge 56 extends into the body 12 more than the portion 74 furthest from the hinge 56.

The length of the at least one guide member is chosen so that the portions 72 and 74 clear the upper edge of the wall portion 34 at the open end and shoulder 48. More specifically, the distance from hinge 56 to portions 72 and 74 needs be less than the distance from hinge 56 to the opposed wall portion 34 and shoulder 48.

The tubular guide member 66 may be provided with an opening or slot 75 so that the free end can extend further into the space portion 42 and still clear the cannula. Thus the guide member is shaped to allow the guide member to pass the cannula as the guide member is rotated between the guide and non-guide positions. Where the at least one guide member comprises structure other than a tubular member, such as a series of elongate fingers, the guide members merely need to be spaced to provide clearance for the cannula.

The main cap 52 includes an annular ring 76 adjacent its peripheral edge that engages the inside of the wall 34. The open end 20 of the body 12 has a lip 78 and the main cap 52 includes a toothed arm 80 that engages under the lip when in the closed position, as seen in FIG. 6, and retains the main cap closed, such as when the sampling port 10 is inverted and gravity will urge the cap 52 to rotate to an open position. The lip 78 may include a notch or recess 81 to aid connection of the toothed arm 80 with the lip 78. The upper wall 62 may also include a tab 83 opposite hinge 56 to aid a user in opening the main cap 52.

With the main cap 52 closed and the secondary cap 54 open a small vial may be inserted into the sampling port 10. Referring to FIG. 12 it will be seen that a small diameter vial 150 inserted into the open end 20 of the sampling port, if inserted off centre, will first contact the transition region 68 and then enter the tubular guide member 66 and be located centrally over cannula 24. The guide member 66 prevents any significant sideways movement of the vial 50 as it is inserted further and impaled on the cannula.

Because the free end 70 of the guide member 66 extends to near the free end 26 of the cannula, when the cannula first contacts the septum 152 of vial 150, the vial is still guided by the guide member 66. The vial 150 may be impaled on the cannula 24 by further inwards movement. In the embodiment shown the distance 120 from the free end 70 of the guide member 66 to the small diameter wall portion 32 is less than the length 122 of the cap 124 of the vial and the cap 124 remains guided by the guide member 66 even when fully impaled.

Figure 14:
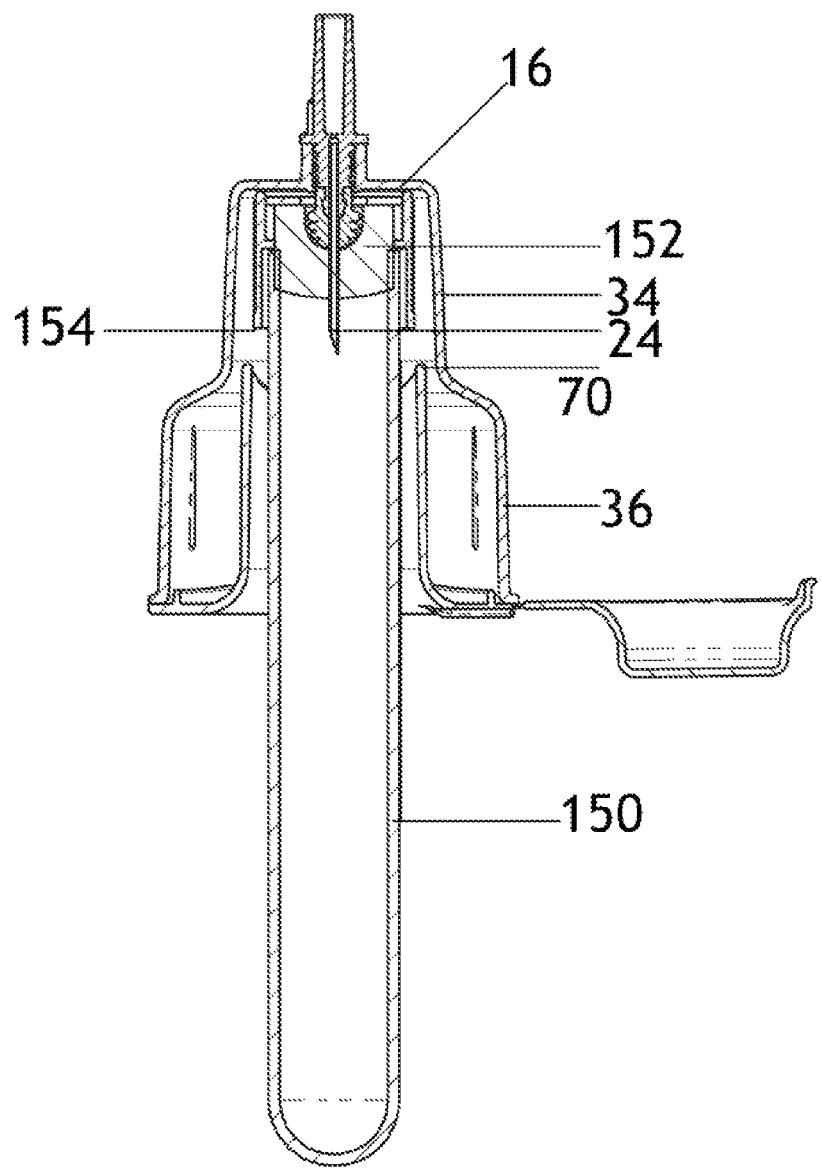
FIG. 14 is a cross sectional side view of the sampling port according to a second embodiment in use with a first size vial.
Figure 15:
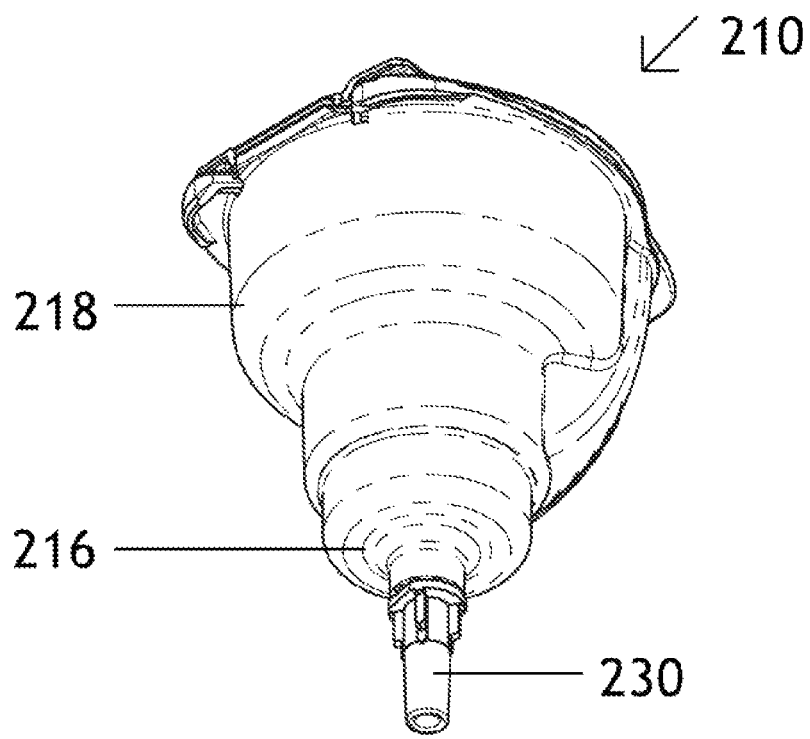
FIG. 15 is a perspective view from above of a sampling port according to a third implementation of the invention in a fully closed configuration.
Figure 16:
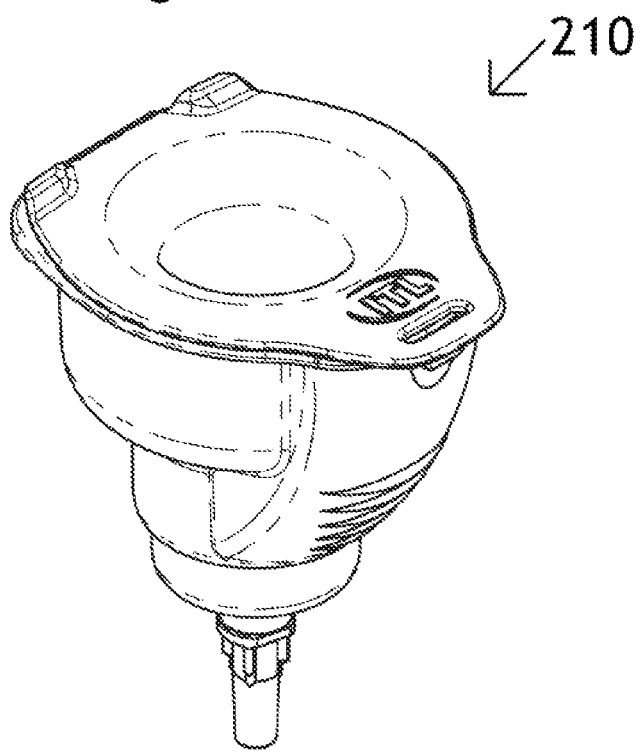
FIG. 16 is a perspective view from below of the sampling port of FIG. 15.

The length of the vial cap may be such that it ceases to be engaged with the guide member 66 before engagement with the wall 32. Further, the triple diameter configuration of FIGS. 1 to 13, whilst preferable, is not essential. A double diameter configuration without an intermediate diameter portion is also viable, as shown in FIG. 14. Accordingly, the invention also includes versions (see FIG. 14), in which the small diameter portion 32 is omitted and the intermediate wall portion 34 extends from the base. In these circumstances, although the vial 150 may cease to be in contact with the guide member 66 when fully impaled, as shown in FIG. 12, the guide member provides sufficient guidance to prevent damage to the cannula 24.

To aid retraction of the vial 150 from the body 12 the free end 70 of the guide member 66 may be flared radially outwards so that any step or discontinuity in the vial, such as step 154, does not catch on the free end 70. This may be applied to all embodiments of the invention.

The size of the tubular guide member 66 is such that potentially a person could deliberately or accidentally insert a body part, such as a finger into the tubular guide member 66 and contact the cannula 24. Accordingly, the secondary cap 54 is provided to close the opening 64. The secondary cap 54 has a closed base wall 82 and a peripheral wall 84. The peripheral wall 84 is shaped to correspond to the transition region 68 and the upper end of guide 66 and is preferably an interference fit in the opening. A tab 86 is provided to aid a user in withdrawing the secondary cap 54 from the opening 64. In the preferred embodiment the secondary cap 54 includes an arm 88 extending from the peripheral wall 84 to hinge 58. Preferably the main cap 52 is provided with a recessed portion 90 that allows the upper surfaces of the arm 88 and upper wall 62 to be substantially co-planar.

The rim 78 preferably includes extensions 96 that extend either side of hinge 56 and into the path of the edge 94 of cap 52. When the cap 52 is moved to its open position, as in FIG. 8, the edge of the cap deflects to clear protrusions 96. This then holds the cap 52 in the open position against the action of gravity, as the sampling port is manipulated. Other means of holding the cap 52 open may be used.

The hinge 58 for cap 54 is an over centre type hinge that inherently holds the cap 54 in its open position. Other means of holding the cap 54 open may be used.

Referring to FIGS. 15 to 25 there is shown a sampling port 210 according to another implementation of the invention.

The sampling port 210 has a generally tubular body 212. The body 212 has a base 216 at one end and a side wall 218 that extends away from the base 216. The side wall 218 defines an open end 220. Mounted on the base 216 is a needle assembly 222 having a cannula 224. The cannula 224 is mounted generally centrally and extends along the body toward the open end 220. The free end 226 of the cannula 224 is located away from the open end 220. A rubber sheath 228 preferably surrounds the cannula 224.

The interior of the cannula 224 communicates with a connector or piercing device of needle assembly 222 so that fluid may pass from the connector to the cannula 224 or vice versa. In the implementation shown the connector is a male Luer connector 230 and the assembly 222 is a screw fit into base 216. If desired the base 216 and assembly 222 may be formed together with the cannula mounted in the integral base. The type of connector or piercing device is not critical and variations may be used, including a male or female Luer, locking Luer, multi-sample (double-ended) needle, blunt cannula, spike etc.

The side wall 218 is formed of three generally cylindrical wall portions arranged so the diameter of the body 212 increases in steps away from the base 216. Third wall portion 232 is of one diameter near the base 216, followed by second wall portion 236 and a first wall portion 238 of a larger diameter yet further away from the base 216. The third wall portion 232 defines a third space portion 240, the second wall portion 236 defines a second space portion 242 and first wall portion 238 defines a first space portion 244. The third and second and second and first wall portions are joined by shoulder portions 246 and 248 respectively. Shoulder portions 246 and 248 preferably extend at an angle to the respective wall portions but may each may extend perpendicularly to the wall portions independently of each other.

Figure 23:
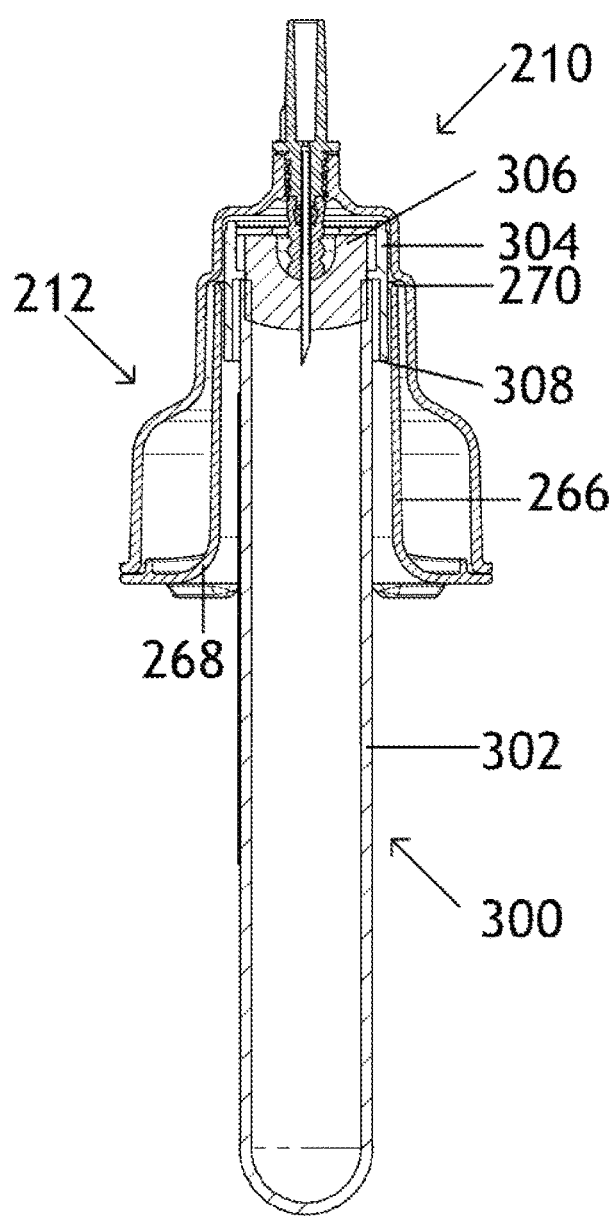
FIG. 23 is a cross sectional side view of the sampling port of FIG. 15 in use with a first size vial.
Figure 24:
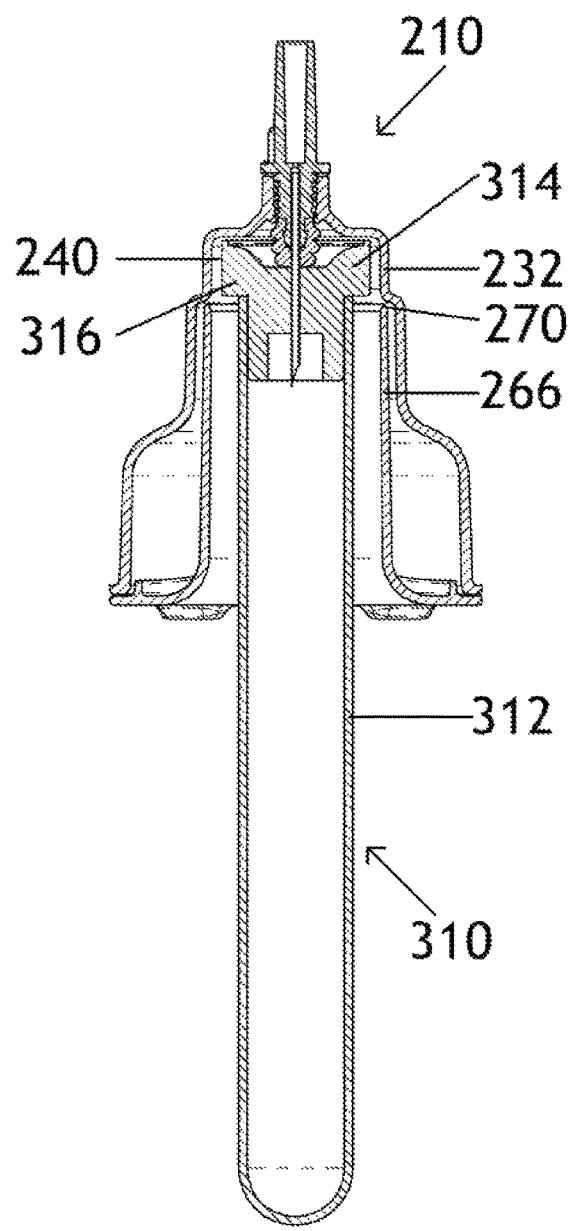
FIG. 24 is a cross sectional side view of the sampling port of FIG. 15 in use with a second size vial.
Figure 25:
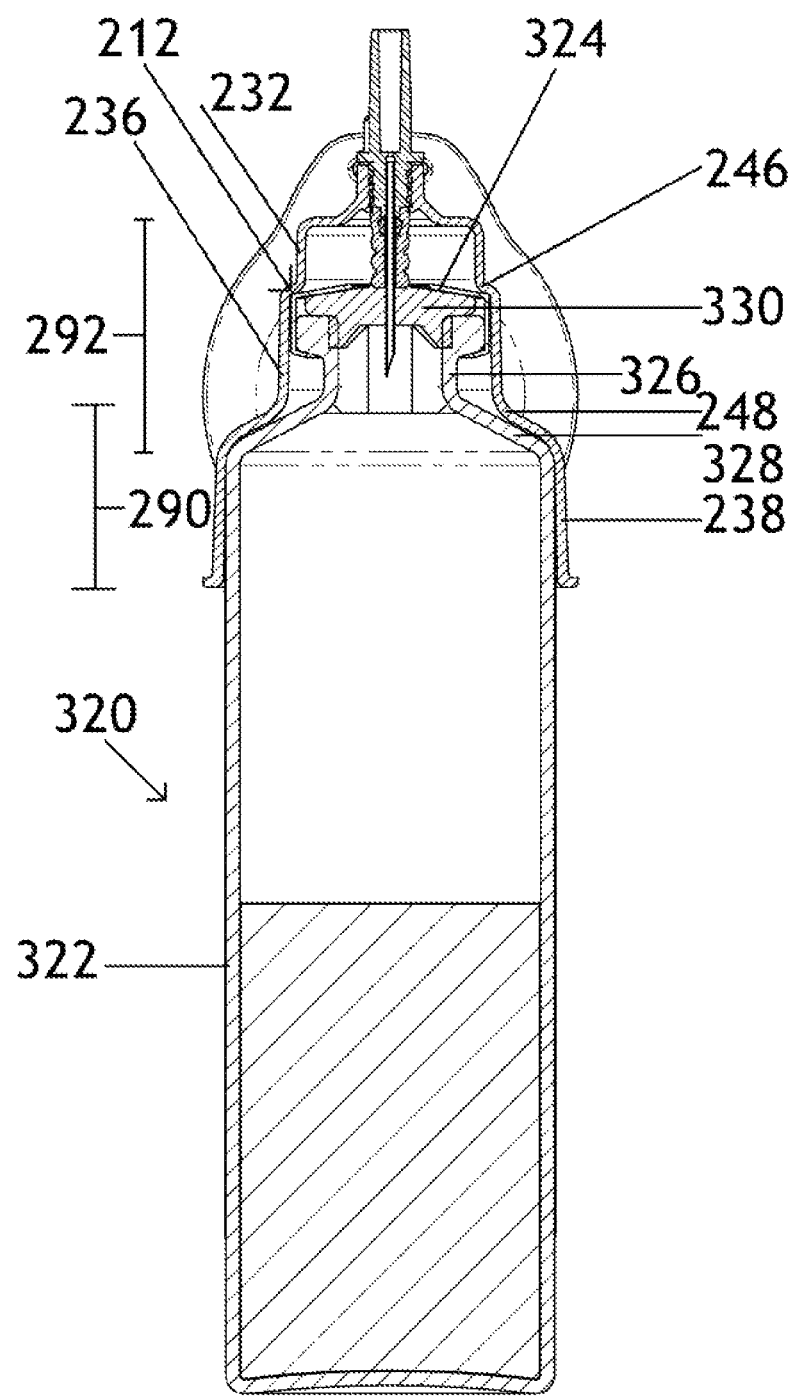
FIG. 25 is a cross sectional side view of the sampling port of 15 in use with a third size vial.

The space portion 240 is sized to accommodate and guide the cap 304 of a sampling vial 300, as shown in FIG. 23 or a sampling vial 310 of smaller diameter and/or with a smaller cap, bung or septum 314, as shown in FIG. 23. The space portions 242 and 244 are sized to accommodate a sampling bottle 320 having a larger diameter body 322 and cap 324.

The end 226 of cannula 224 is preferably located within the space portion 242 but may be located in space portion 244.

The effective combined length 290 of the larger diameter first space portion 244 and shoulder portion 248 is preferably greater than the length 292 of the cap 324, neck portion 326 and bottle shoulder portion 328. As such, when a sampling bottle 320 is inserted into the body 212, the bottle body 312 will engage and centre on the larger diameter wall 238 before the cap 314 reaches the smaller diameter wall 236. The cap 324 will then engage the wall 236 to, if necessary, further centralise the cap 324 and correct any misalignment before further insertion will impale the septum 330 on the cannula 224. Depending on the configuration of the bottle 310, inwards movement may be limited by one or both of the ends of the cap 324 engaging the shoulder 246 and the shoulder 328 of bottle 310 engaging the shoulder 248. Alternatively or in addition, the wall 234 may be tapered inwards toward base 216 so as to limit inwards movement.

The diameter of the space portion 240 is sized to receive and engage a small diameter vial. However, the diameters of the space portions 242 and 244 are larger than that of a small diameter vial and so a small diameter vial inserted into the open end 220 would not be located and prevented from sideways movement by the wall portion 234 and 236.

The sampling port 210 is provided with a cap and guide assembly 250. The cap and guide assembly 250 comprises main cap 252. Compared to the first embodiment there is no secondary cap, but one may be provided. The main cap 252 is connected to the body 212 for rotation about hinge 256.

Figure 17:
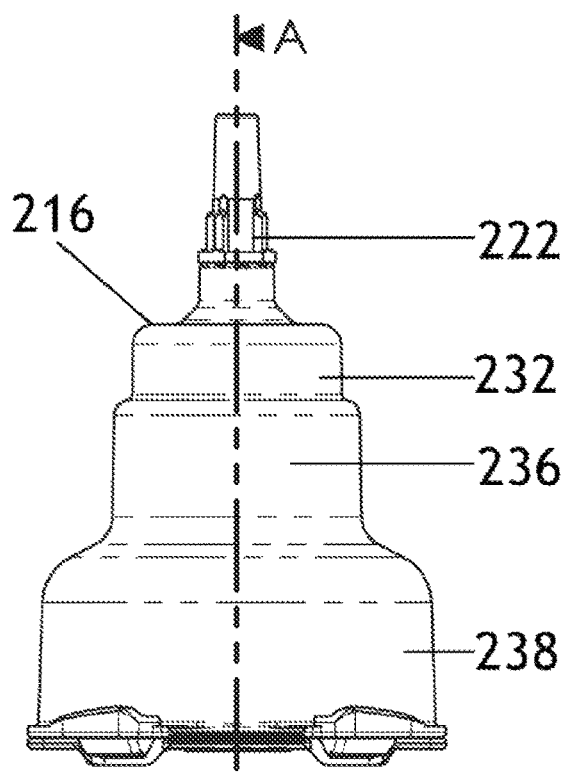
FIG. 17 is a side view of the device of FIG. 15.
Figure 18:
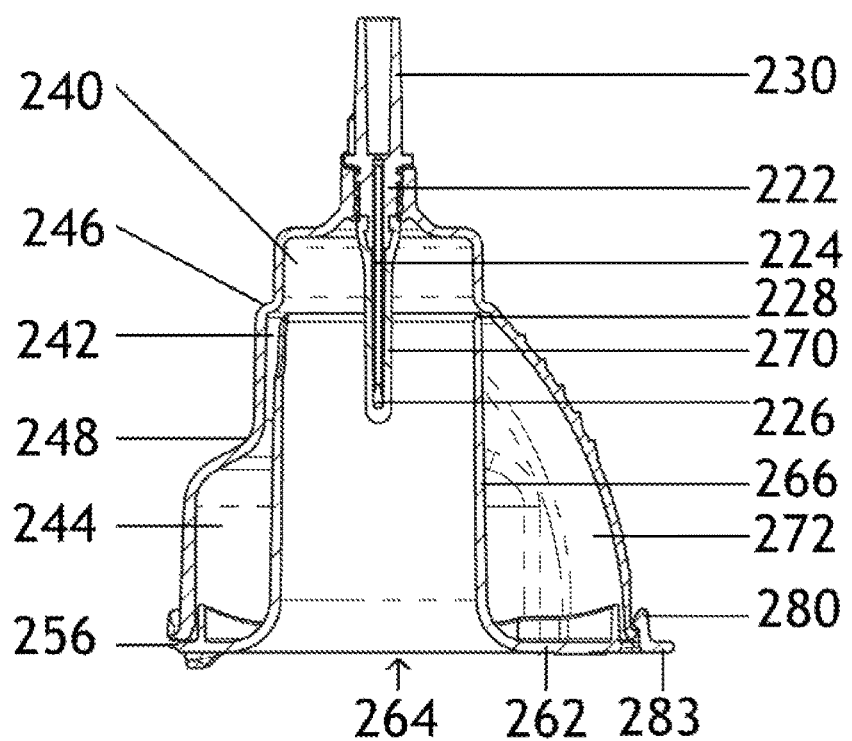
FIG. 18 is a cross sectional side view of the sampling port of FIG. 15 taken along line AA in FIG. 17.
Figure 19:
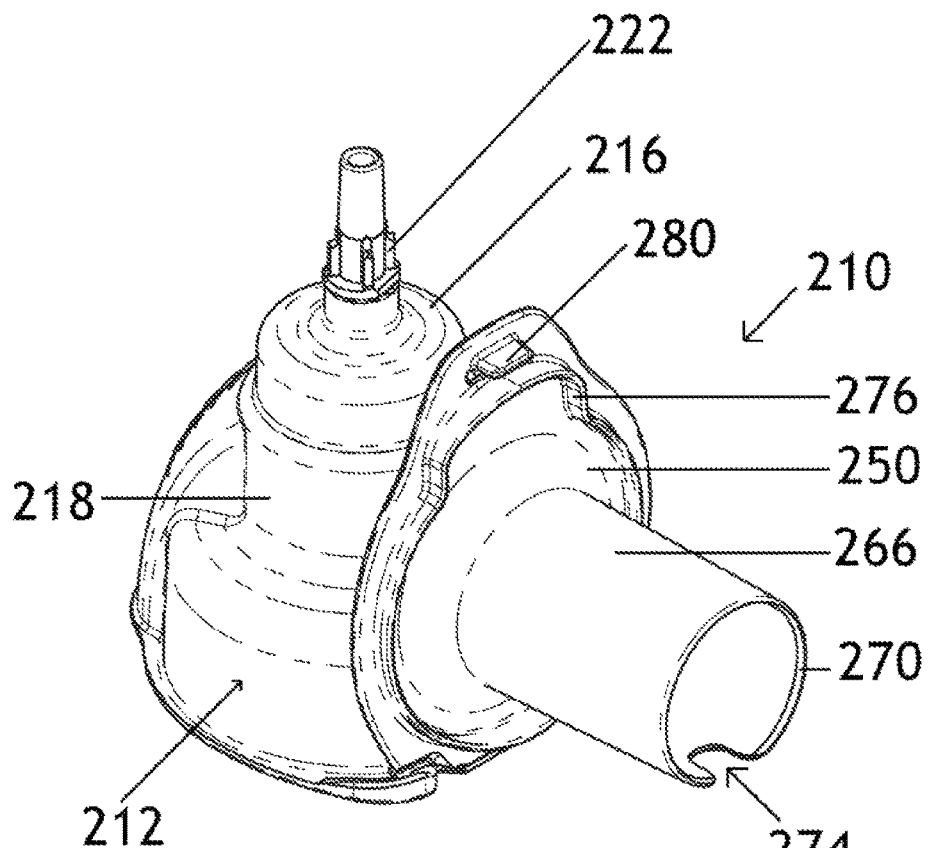
FIG. 19 is a perspective view from above of the sampling port of FIG. 15 in an open position.
Figure 20:
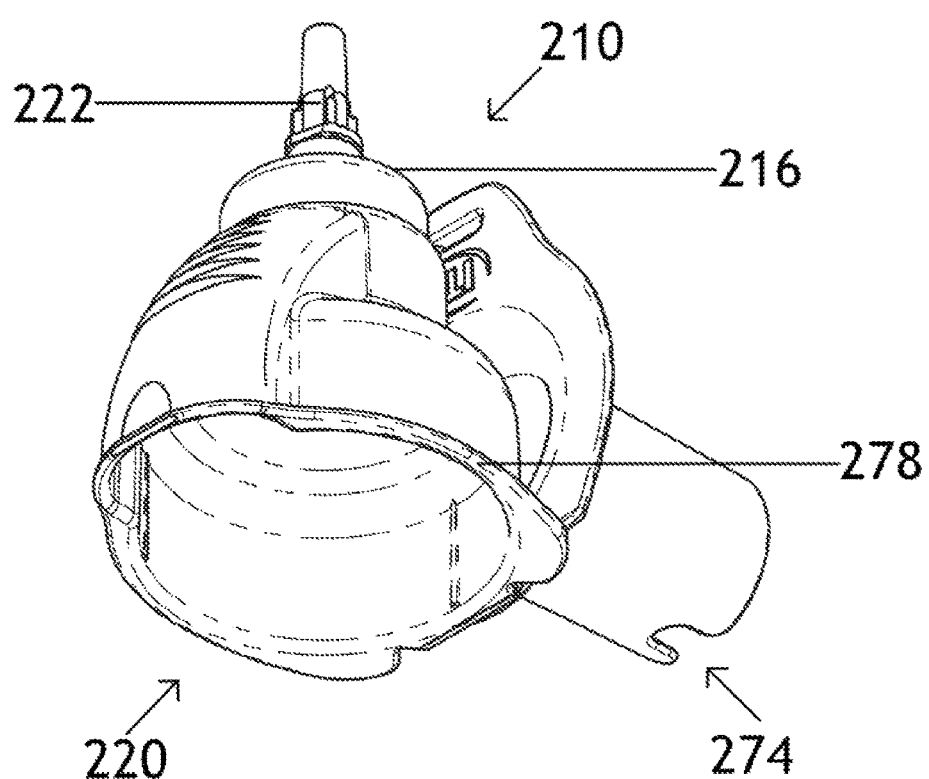
FIG. 20 is a perspective view from below of the sampling port of FIG. 15 in an open position.
Figure 21:
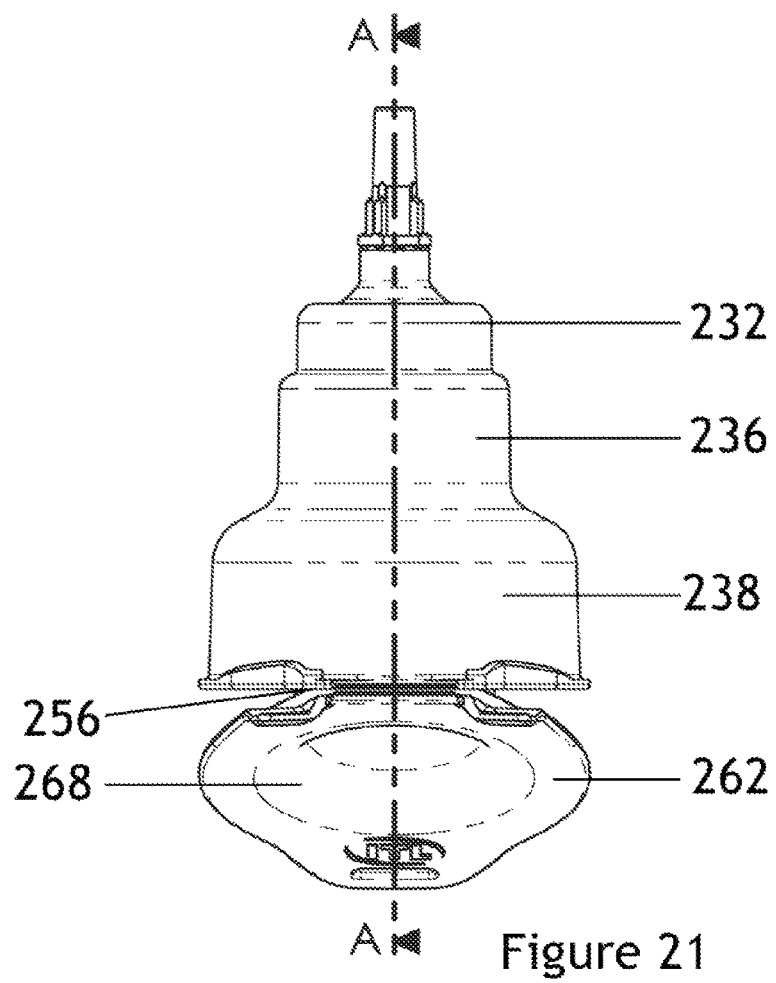
FIG. 21 is a front view of the device of FIG. 15 in a partially closed configuration.

The main cap 252 may be rotated from a closed position, as in FIGS. 17 and 18 to an open position, as in FIGS. 19 and 20. In the open position the main cap 252 is rotated about 270 degrees about hinge 256 relative to the closed position.

The main cap 252 includes an upper wall 262 having an aperture 264 therein and at least one guide member 266 that extends from the upper wall 262 about aperture 264. In the embodiment shown the at least one guide member 266 comprises a tube but other guide member structures may be used. A series of fingers surrounding aperture 264 may be provided.

The tubular guide member 266 is provided with a curved transition region 268 to aid insertion of a vial into the aperture and guide member. The tubular guide member 266 is preferably formed integrally with upper wall 262 but may be formed as a separate component that is connected to the main cap 252.

The sizes of the aperture 264 and tubular guide member 266 correspond to the size of a small diameter vial.

As seen in FIG. 18, when the main cap 252 is closed the tubular guide member 266 extends toward the cannula 224. In the embodiment shown the tubular guide member 266 extends so at least part of its free end 270 extends into the space portion 242 and more preferably past the free end 226 of the cannula 224 to be adjacent the shoulder 246.

As seen in FIGS. 18 and 19 the free end 270 of guide member 266 is generally perpendicular to the wall of tubular guide member 266, unlike the first and second embodiments that have a curved end. Thus the free end 270 is equidistant from the shoulder 246 at all circumferential locations.

As seen in FIG. 18 there is a small gap between the free end 270 and the shoulder 246. The inside diameter of the tubular member 266 is preferably the same as the inside diameter of the wall portion 232 defining space 240.

Figure 22:
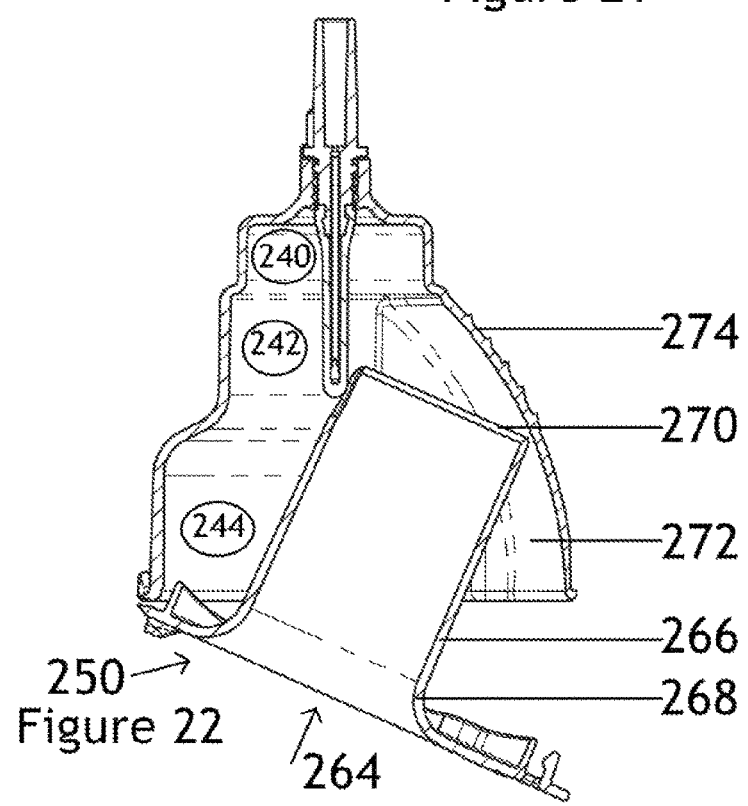
FIG. 22 is a cross sectional side view of the sampling port of FIG. 15 taken along line AA in FIG. 19.

Whereas the tubular member of the first and second embodiments is shaped to allow clearance of the body 12, in this embodiment the free end 270 would contact the side walls if they were cylindrical. Accordingly, the side wall 218 is shaped so as to provide a recess 272 opposite the hinge. As best seen in FIG. 22, the recess 272 is sized so the part 274 of tubular body furthest from hinge 256 clears the tubular body as the main cap 252 rotates in and out of the body 212.

The tubular guide member 266 is provided with an opening or slot 274 so that the free end 270 can clear the cannula 224 and rubber sheath 228. Thus the guide member is shaped to allow the guide member to pass the cannula as the guide member is rotated between the guide and non-guide positions.

Where the at least one guide member comprises structure other than a tubular member, such as a series of elongate fingers, the guide members merely need to be spaced to provide clearance for the cannula.

The main cap 252 includes a wall 276 adjacent its peripheral edge that engages the inside of the wall 234. The open end 220 of the body 212 has a lip 278 and the main cap 252 includes a toothed arm 280 that engages under the lip when in the closed position, as seen in FIG. 18, and retains the main cap closed, such as when the sampling port 210 is inverted and gravity will urge the cap 252 to rotate to an open position. The lip 278 may include a notch or recess similar to recess 81 of the first embodiment to aid connection of the toothed arm 280 with the lip 278. The upper wall 262 may also include a tab 283 opposite hinge 256 to aid a user in opening the main cap 252.

With the main cap 252 closed a small vial may be inserted into the sampling port 210. Referring to FIG. 22 it will be seen that a small diameter vial 300 inserted into the open end 220 of the sampling port, if inserted off centre, will first contact the transition region 268 and then enter the tubular guide member 266 and be located centrally over cannula 224. The guide member 266 has a diameter only slightly less than the diameter of the cap 304 and so prevents any significant sideways movement of the vial 300 as it is inserted further and impaled on the cannula 224.

Because the free end 270 of the guide member 266 extends past the free end 226 of the cannula, when the cannula first contacts the septum 306 of vial 300, the vial is still guided by the guide member 266. The septum 306 may be impaled on the cannula 224 by further inwards movement. In the embodiment shown the cap 304 of the vial remains within the guide member 266 and so the cap 304 remains guided by the guide member 266 even when fully impaled. When the vail is withdrawn, because the cap 304 has remained partially within guide member 266 there is no possibility of the end 308 catching on the end 270 of the guide member 266.

FIG. 23 shows the sampling port 210 in use with another small vial 310. The vail has a body 312 and a septum 314, both of which have a diameter smaller than inner diameter of guide member 266 and end space 240. The septum 314 has a larger diameter than the vial body 312 and so has an annular portion 316 adjacent the end of the vial body 312. The larger diameter septum assists the vial 310 to be guided onto the cannula 224 and into the space 240 by guide member 266. Although the annular portion 316 may lie within the space 240 and not within the guide member 266, because the guide member 266 has the same inner diameter as the space 240 and its end 270 is positioned close to the space 240 and shoulder 246, when the vial 310 is withdrawn it cannot catch on the free end 270.

To aid retraction of a vial with a short septum or cap, such as vial 310, from the body 212, the free end 270 of the guide member 266 may be flared radially outwards.

The triple diameter configuration of the third embodiment, whilst preferable, is not essential. A double diameter configuration without the smallest diameter portion, similar to that of FIG. 14, is also viable. Accordingly, the invention also includes variants of the third embodiment in which the small diameter portion 232 is omitted and the intermediate wall portion 234 extends from the base. In these circumstances, the guide member 266 and associated recess 272 may extend nearer to the base 216 wall to reduce or eliminate any axial gap between the annular portions 316 of a small diameter vail. When used with a vial, such as vial 300 with a longer cap 304, the cap will remain within the guide member 266.

The rim 278 preferably includes extensions 296 that extend either side of hinge 256 and into the path of the edge 294 of cap 252. When the cap 252 is moved to its open position, as in FIG. 28, the edge of the cap deflects to clear protrusions 296. This then holds the cap 252 in the open position against the action of gravity, as the sampling port is manipulated. Other means of holding the cap 252 open may be used.

In both cases, user action on the respective cap may return the cap to its close position.

Unless the context clearly requires otherwise, throughout the description and any claims the words "comprise", "comprising", and the like are to be construed in an inclusive sense as opposed to an exclusive or exhaustive sense; that is to say, in the sense of "including, but not limited to".

The features of the invention described or mentioned in this document may be combined in any combination of features where features are not mutually exclusive.

It will be apparent to those skilled in the art that many obvious modifications and variations may be made to the embodiments described herein without departing from the spirit or scope of the invention.

The invention claimed is:

1. A sampling port having:
   a body having a space having a longitudinal direction, open at a first end and adapted to receive a sampling vial;
   the body comprising first and second portions spaced along the longitudinal direction with the first portion nearer the first end than the second portion;
   the first portion adapted to receive a tubular body having a maximum first diameter;
   the second portion adapted to receive a tubular body having a maximum second diameter, smaller than the first diameter;
   a cannula having an axis and extending longitudinally along the space with a pointed end facing the open first end, whereby a sampling vial passed into the space from the open first end may be impaled on the cannula;
   a tubular guide member mounted on or connected to the body for rotational movement about a hinge located at or adjacent the first end, the guide member moving between a guide position and a non-guide position by rotation about the hinge, wherein:
   in the guide position at least part of a free end of the guide member extends into the second portion to reduce the effective size of part of the second portion to receive a tubular body of a maximum third diameter, and
   at least part of guide member overlaps at least part of the cannula in the longitudinal direction, and
   in the non-guide position all of the at least one guide member is located outside of the space, and
   wherein, the guide member and the body are configured so that for any part of the free end of the guide member lying in a plane extending longitudinally and perpendicularly to the hinge axis and through the longitudinal axis, the path:
   passes through the longitudinal axis;
   clears the body and
   passes through the first end, and
   wherein the guide member is shaped to allow the guide member to pass the cannula as the guide member is rotated between the guide and non-guide positions.

2. The sampling port of claim 1 wherein, the guide member is configured so that as the guide member moves between the guide and non-guide positions, for any part of the free end of the guide member when the guide member is at a position at which a transverse plane extending perpendicular to the longitudinal axis passing through said any part also passes through the second portion, the distance of said any part perpendicular to the longitudinal axis is no more than half the second diameter.

3. The sampling port of claim 1 wherein, as guide member moves between the guide and non-guide positions, for any part of the free end of the guide member when the guide member is at a position at which a transverse plane extending perpendicular to the longitudinal axis passing through said any part also passes through the first portion, the distance of said any part perpendicular to the longitudinal axis is no more than half the first diameter.

4. The sampling port of claim 1 wherein, as the guide member moves between the guide and non-guide positions, for at least part of the free end of the guide member when the guide member is at a position at which a transverse plane extending perpendicular to the longitudinal axis passing through said at least part also passes through the second portion, the distance of said at least part perpendicular to the longitudinal axis is more than half the second diameter.

5. The sampling port of claim 4 wherein at least the second portion has at least one second slot or recess adapted to receive said at least part of the free end of the guide member when said distance of said at least part perpendicular to the longitudinal axis is more than half the second diameter.

6. The sampling port of claim 4 wherein for at least part of the free end of the guide member when the guide member is at a position at which a transverse plane extending perpendicular to the longitudinal axis passing through said at least part also passes through the first portion, the distance of said at least part perpendicular to the longitudinal axis is more than half the first diameter.

7. The sampling port of claim 6 wherein at least the first portion has at least one first slot or recess adapted to receive said at least part of the free end of the guide member when said distance of said at least part perpendicular to the longitudinal axis is more than half the first diameter.

8. The sampling port of claim 1 wherein the body comprises a third portion spaced along the axial direction with the second portion nearer the first end than the third portion, the third portion adapted to receive a tubular body having a maximum fourth diameter, smaller than the second diameter.

9. The sampling port of claim 1 wherein at least part of a free end of at least one guide member is adjacent an inner end of the second portion.

10. The sampling port of claim 7 wherein said at least one first slot or recess is provided opposite the hinge and extends axially to the first end.

11. The sampling port of claim 1 wherein all parts of the or each free end of the or each guide member extend into the body from the open end the same amount or are located in a common plane perpendicular to the axis of the cannula.

12. The sampling port of claim 11 wherein the common plane is in the second portion.

13. The sampling port of claim 11, when dependent on claim 8, wherein the common plane is adjacent the junction of the second and third portions.

14. The sampling port of claim 12, when dependent on claim 8, wherein the common plane is adjacent the junction of the second and third portions.

15. The sampling port of claim 1 wherein at least the first and second portions are defined by generally tubular walls.

16. The sampling port of claim 1 wherein, in the longitudinal direction, at least part of the guide member is further from first end than the free end of the cannula.

17. The sampling port of claim 1 wherein at least part of the free end of the guide member extends further into the body from the open end more than another part of the free end of the guide member.

18. The sampling port of claim 1 comprising at least one protective member that in a protective position closes the open end sufficiently to substantially prevent accidental access to the cannula by a user.

19. The sampling port of claim 16 the guide member comprises a slot in the tubular body through which at least the free end of the cannula passes through as the guide member moves between the guide and non-guide positions.

20. The sampling port of claim 8 wherein at least part of a free end of the guide member is adjacent a shoulder joining the second and third portions.

* * * * *